April 28, 1959 C. THUMIM 2,884,569

CIRCUIT BREAKER ANTI-PUMPING DEVICE

Filed Oct. 2, 1953 7 Sheets-Sheet 1

INVENTOR.
CARL THUMIM
BY
Ostrolenk & Faber
ATTORNEYS

CIRCUIT BREAKER ANTI-PUMPING DEVICE

Filed Oct. 2, 1953 7 Sheets-Sheet 2

INVENTOR.
CARL THUMIM

BY

Ostrolenk & Faber

ATTORNEYS

CIRCUIT BREAKER ANTI-PUMPING DEVICE

Filed Oct. 2, 1953 7 Sheets-Sheet 3

INVENTOR.
CARL THUMIM

BY

Ostrolenk & Faber
ATTORNEYS

April 28, 1959 C. THUMIM 2,884,569

CIRCUIT BREAKER ANTI-PUMPING DEVICE

Filed Oct. 2, 1953 7 Sheets-Sheet 4

INVENTOR.
CARL THUMIM

BY

Ostrolenk & Faber

ATTORNEYS

April 28, 1959 C. THUMIM 2,884,569

CIRCUIT BREAKER ANTI-PUMPING DEVICE

Filed Oct. 2, 1953 7 Sheets-Sheet 5

INVENTOR.
CARL THUMIM

BY

Ostrolenk & Faber

ATTORNEYS

UNDERVOLTAGE LOCKOUT

INVENTOR.
CARL THUMIM
BY
Ostrolenk & Faber
ATTORNEYS

April 28, 1959 C. THUMIM 2,884,569

CIRCUIT BREAKER ANTI-PUMPING DEVICE

Filed Oct. 2, 1953 7 Sheets-Sheet 7

INVENTOR.
CARL THUMIM

BY Ostrolenk, Faber, Gerb & Soffen
ATTORNEYS 2,884,569
Patented Apr. 28, 1959

2,884,569

CIRCUIT BREAKER ANTI-PUMPING DEVICE

Carl Thumim, Lansdowne, Pa., assignor to I-T-E Circuit Breaker Company, Philadelphia, Pa.

Application October 2, 1953, Serial No. 383,714

8 Claims. (Cl. 317—54)

My invention relates to circuit breaker closing means and is more particularly directed to a novel mechanical and electrical arrangement whereby pumping of the closing mechanism is prevented in a system even though the control voltage is taken directly from the power circuit.

A special problem exists in circuit breaker closing when the control voltage for the control relay and closing solenoid is taken from the same source being protected by the circuit breaker.

If the circuit breaker is closed against a low impedance fault, the control voltage will decrease to a small fraction of the normal voltage at the instant the arcing contacts touch. At the instant of contact engagement, the overcurrent trip elements will start to move the trip mechanism. That is, if the circuit breaker is successful in closing, it will trip out due to the energization of the trip coil. However, the drop in voltage will cause the armature of the control relay to drop out and hence, both the control relay and the circuit breaker will be in position for a second closing cycle. That is, after the trip latch is tripped by the overcurrent device, the closing coil will again be energized when the circuit breaker interrupts the circuit and hence, be instrumental in closing the contacts to the closing coil because the previous momentary failure of control voltage has permitted the resetting of the relay latch.

The relay latch may be of the type set forth in my copending application Serial No. 254,349 filed November 1, 1951, now Patent No. 2,792,534.

These reclosing or pumping operations of the circuit breaker will continue as long as the control switch is maintained in closed position. Thus, the reclosing and opening of the circuit breaker will continue until failure or some change in the circuit element causes a change of conditions.

The purpose of my invention is to overcome this disadvantage encountered when the closing mechanism is energized from a control voltage taken from the same source being protected by the circuit breaker.

With the embodiment of my invention there is only one possible closing attempt by the closing solenoid for each operation of the control switch to the closed position.

The control relay to which may invention is particularly adaptable is described in my above mentioned copending application. This type of control relay has its armature and contacts normally latched together. Thus, when the control switch is moved to the closed position and the relay coil is energized, both the relay armature and the normally open contacts in the closing coil circuit are moved simultaneously. The closing coil will be energized and the closing plunger will be operated in a direction to move the circuit breaker operating parts to closed position.

At the completion of the stroke, the closing plunger will trip and release the latch engagement between the control relay armature and the closing coil contacts.

Thus, even though the control relay armature is maintained in the attracted position due to the continued energization of the control relay coil due to the completed circuit through the control switch, the energization for the closing solenoid will be interrupted due to the release of the latch and hence, if the circuit breaker is tripped open, no pumping will occur. However, the relay is designed with a bias at its armature to maintain it in open position so that following a closing operation, the relay armature will be moved to its original position to thereby relatch itself to the mechanism controlling the contacts for the energizing of the closing solenoid. This relatching of the two units occurs whenever the control relay coil is de-energized.

Hence, if the control relay coil and closing coil obtain their control voltage from the same source being protected by the circuit breaker, temporary closing on a low impedance fault will cause a sufficient undesirable drop in the control voltage to cause the relay armature to drop out. As above noted this leaves the entire system vulnerable for the pumping operation.

The pumping operation of the type above noted results from the fact that the closing plunger is permitted to resume its neutral position thereby effecting latch reengagement between the relay armature and the means controlling the contacts of the closing solenoid.

Hence, I propose a first embodiment to provide a mechanical lockout latch following a closing stroke which will maintain the closing plunger in a position other than its neutral position and above its latch reset position. In this arrangement the lockout latch is biased toward latched position so that the lockout will occur following each initial attempted closing operation. A reset mechanism is provided which must be operated to unlatch the lockout means prior to a second attempt to electrically close the circuit breaker.

Accordingly, a primary object of my invention is to provide a closing means for circuit breakers which, although obtaining its control voltage from the same source being protected by the circuit breaker, will insure single shot operation and therefore act as an anti-pumping device.

Another object of my invention is to provide a novel arrangement wherein following a closing operation, the closing solenoid will be ineffective to reset the latch engagement between the control relay armature and the means controlling the contacts for the closing solenoid.

Still another object of my invention is to provide a novel anti-pumping device for circuit breaker closing means wherein following a closing operation, a lockout latch prevents the resetting of the closing plunger to its initial position.

Another object of my invention is to provide a mechanical lockout arrangement to prevent pumping of a circuit breaker which automatically latches the closing plunger in a predetermined position after each closing operation and in which reset means are provided to render the lockout means ineffective immediately prior to a closing operation.

In a second embodiment of my invention, I propose to substitute an electrical lockout for the mechanical lockout heretofore described.

Since the undesirable pumping operations occur as a result of re-energization of the control relay coil following its de-energization upon the attempted closing of a high fault line, this undesirable feature can be eliminated by providing means which will prevent an unintentional second energization of the control relay coil.

In this embodiment, I provide cooperating contacts which are in series with the control switch and operative by the movement of the closing plunger.

By adapting the closing mechanism and circuitry with cooperating contacts which are operated by an over center spring mechanism, it is possible to prevent a second unintentional energization of the control relay coil.

In this arrangement, the movement of the closing plunger towards circuit closed position will throw a switch over-center thereby opening contacts which are in series with the control switch. Thus, the upward movement of the closing plunger will cause the automatic interruption of the energization of the relay coil following an attempted closing operation.

Since the auxiliary contacts are controlled by an over-center spring mechanism, the repositioning of the closing plunger to its initial position will permit relatching of the control relay armature to the means controlling the contacts of the closing solenoid. However, even though the control voltage for the control relay drops out and the relay is relatched, a second attempt at closing will be prevented due to the open circuit created by the over-center spring mechanism.

Since the over-center spring means will maintain the auxiliary contacts in an open position immediately following each attempted closing operation, I provide a reset means by which the over-center spring means can be moved to its opposite side to thereby reclose the auxiliary contacts and permit a second intentional energization of the control relay coil through the control switch.

Hence, with this arangement, I can provide a novel anti-pumping means by means of electrical lockout.

Accordingly, an object of my invention is to provide an electrical lockout means for the closing mechanism of a circuit breaker which obtains its control voltage from the same source being protected by the circuit breaker.

Another object of my invention is to provide closing means for a circuit breaker which will prevent an unintentional second energization of the control relay coil.

A further object of my invention is to provide a novel closing means for circuit breakers in which anti-pumping features are achieved by means of controlling auxiliary contacts in series with the control relay coil by the closing plunger. That is, whenever the closing plunger is moved to effect closing of the circuit breaker, it will automatically interrupt auxiliary contacts in the control relay circuit to insure that the control relay coil will not be re-energized even though the operator maintains the control switch in a closed position.

Another object of my invention is to provide an over-center spring means which mechanically couples the closing plunger to auxiliary contacts in the control relay circuit in such a manner that movement toward a predetermined position of the closing plunger will automatically interrupt the closing relay circuit.

Another object of my invention is to provide an over-center means which although it will prevent second re-energization of the control relay coil can be rendered ineffective by reset means prior to a second intentional closing operation.

In a third embodiment of my invention, I provide electro-mechanical lockout which has been heretofore described in connection with the first and second embodiments.

In this arrangement, both a mechanical lockout latch for the closing solenoid and auxiliary contacts in the control relay circuitry are provided to prevent pumping operation of the circuit breaker when an attempt is made to close same on a fault line.

As heretofore noted, attempted reclosing operations can be eliminated by preventing the closing solenoid from relatching the control relay and/or eliminating second unintentional energization of the control relay. This third embodiment incorporates both of these features in a novel arrangement wherein a member biased in a first direction carries a latch at one end which is biased in the opposite direction and carries a bridge member for the auxiliary contacts at its opposite end. Thus, when the closing plunger is moved toward closing position, the latch will automatically be biased in such a position as to prevent repositioning of the plunger towards its initial position. Also, the member will be rocked in such a direction as to open the energizing circuit for the control relay. Thus, a double protection is provided to insure that the closing mechanism will be a single shot device.

In the event that the operator desires to attempt a second closing of the circuit breaker, a reset circuit is provided so that the latch can be removed from the closing plunger and the auxiliary contacts engaged.

Accordingly, another object of my invention is to provide an electro-mechanical lockout arrangement to insure single shot operation of closing means energized by control voltage obtained from the source protected by the circuit breaker.

Another object of my invention is to provide a closing means which, following an attempted closing operation, will both prevent the repositioning of the closing plunger to its initial position and interrupt the energizing circuit for the control relay.

Another object of my invention is to provide a mechanical means comprising two biased link members which following a closing operation will function to lock out the closing plunger and interrupt the circuit for the control relay.

In a fourth embodiment of my invention, I provide an undervoltage arrangement which will insure single shot operation of the control relay. In this arrangement, I provide a set of auxiliary contacts in the energizing circuit of the control relay which are operative by an undervoltage circuit arrangement.

A relay mechanism controlling the auxiliary contacts is comprised of a voltage coil, a magnetic member and armature connected to the auxiliary contacts. The voltage coil is responsive to the voltage across the source energizing the line protected by the circuit breaker.

A bias maintains the armature away from the magnet and maintains the auxiliary contacts in an open position. Thus, when an attempt is made to close the circuit breaker on a fault line, the drop in energization of the voltage coil will cause the undervoltage armature to drop out thereby interrupting the circuit of the control relay at the auxiliary contacts. A reset means is provided to move the armature toward the magnet and close the auxiliary contacts prior to an intentional second closing operation.

Thus, I have provided an electrical arrangement whereby means responsive to a predetermined low magnitude of voltage will be effective to interrupt the energizing circuit for the control relay and thereby prevent pumping operations.

Accordingly, a further object of my invention is to provide a novel undervoltage lockout for a circuit closing means which will insure single shot operation of the circuit breaker.

Another object of my invention is to provide an undervoltage relay means which will control auxiliary contacts in the energizing circuit of the control relay in such a manner that the energization of the control relay through the auxiliary contacts will be interrupted only when an attempt is made to close a circuit on a severe fault.

These and other objects of my invention will be apparent from the following description when taken in connection with the drawings in which.

Figure 8A:
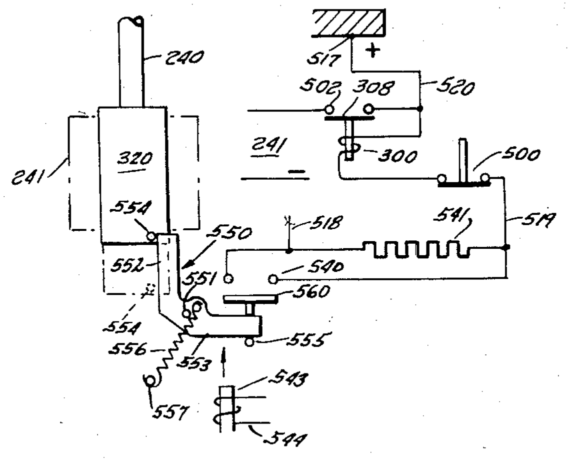

Figure 8*a* is a schematic partial view of the automatic closing operating system for a circuit breaker and illustrates my second embodiment which operates on the principle of electrical lockout.

Figure 8B:
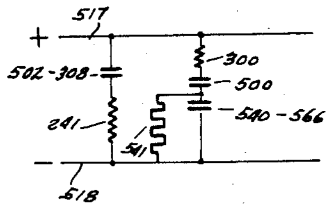

Figure 8*b* is a circuit diagram of the arrangement of the second embodiment of Figure 8*a*.

Figure 9:
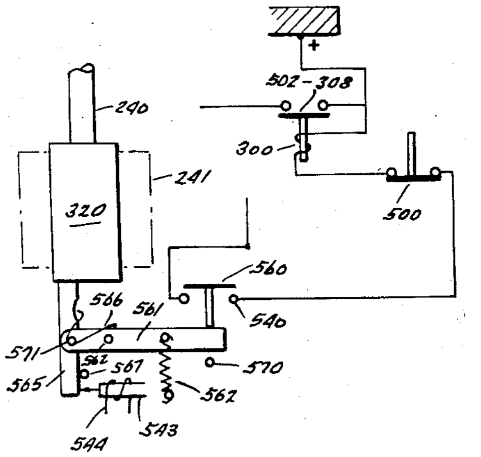

Figure 9 is a partial schematic view of an automatic closing system. This figure illustrates my third embodiment which utilizes the principle of electro-mechanical lockout. This figure illustrates the position of the various parts immediately following an attempted closing operation.

Figure 10:
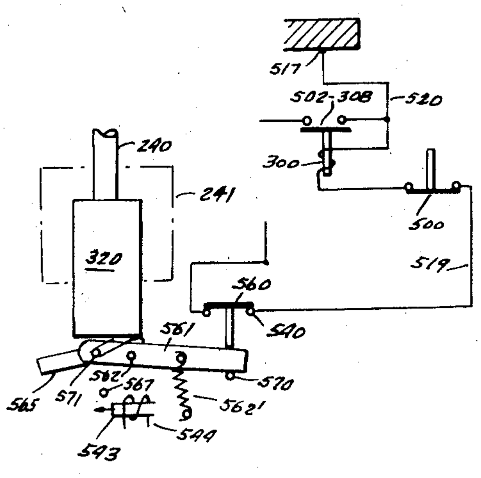

Figure 10 is a partial schematic view similar to Figure 9 and shows the position of the parts of Figure 9 following the operation of the reset means immediately prior to an intentional closing operation.

Figure 10A:
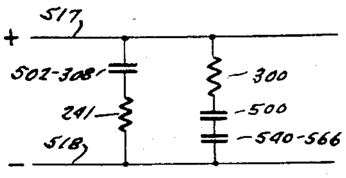

Figure 10*a* is a circuit diagram of the electro-mechanical lockout of Figures 9 and 10.

Figure 11:
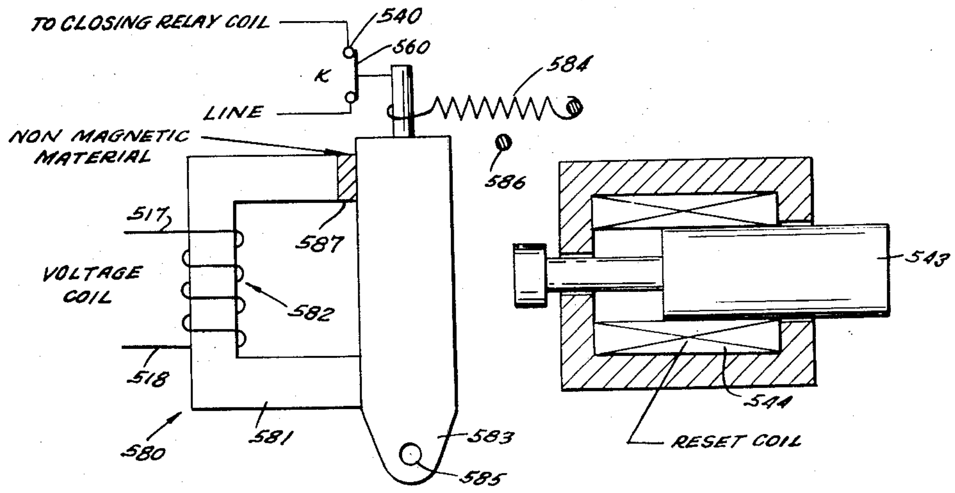

Figure 11 illustrates a fourth embodiment of my invention utilizing the principle of under-voltage lockout.

Figure 12:
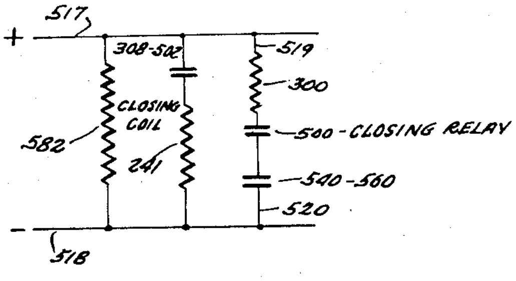

Figure 12 is an electrical circuit diagram used in connection with under-voltage lockout arrangement illustrated in Figure 11.

Figure 1:
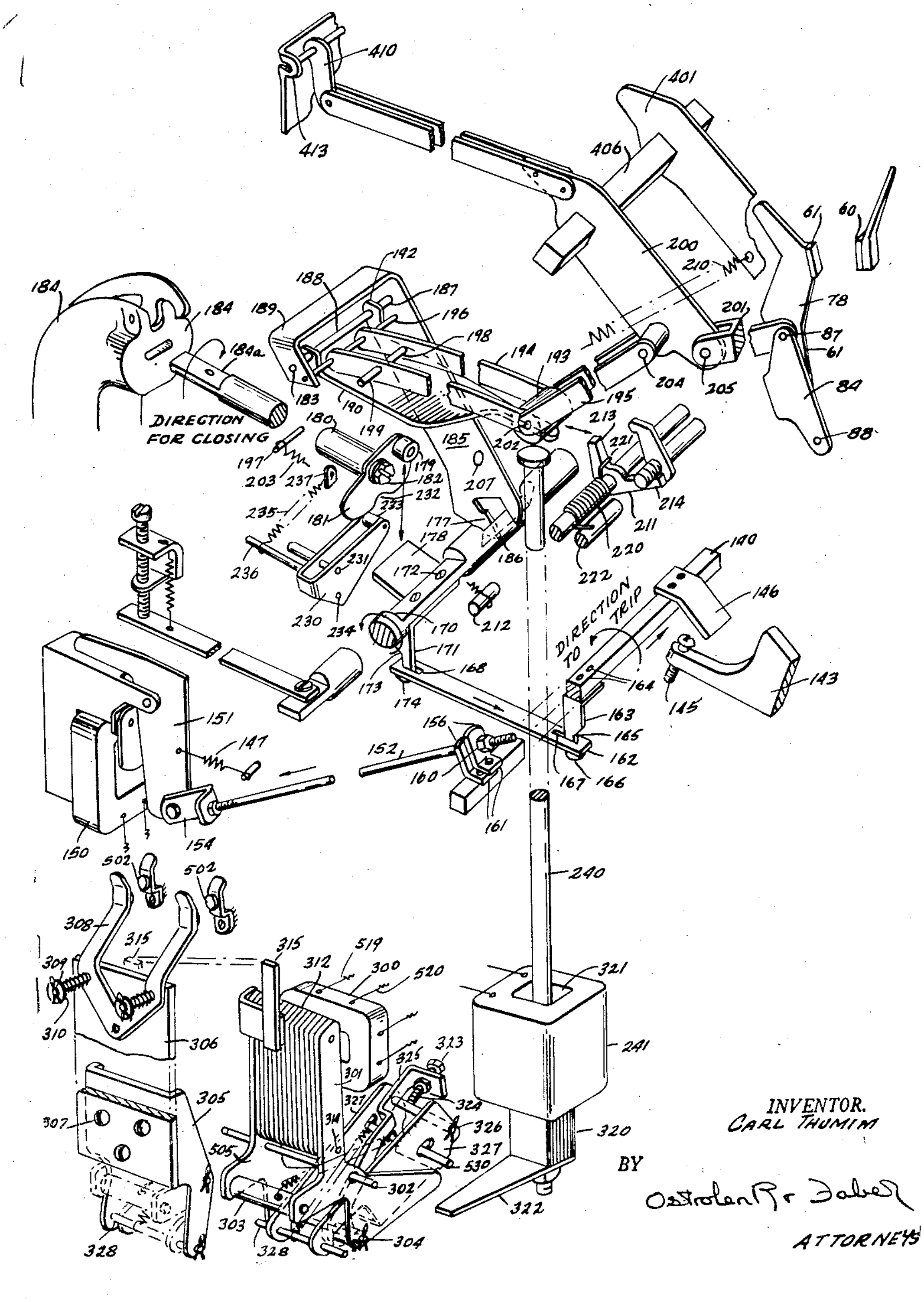
Figure 1 is an exploded perspective view of the operating mechanism of a circuit breaker showing the cooperating contacts in the disengaged position. This figure illustrates the latch closing relay arrangement to which my invention is particularly adaptable.
Figure 13:
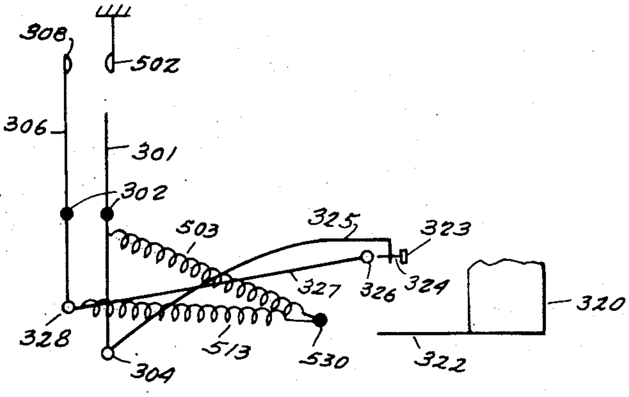
Figure 14:
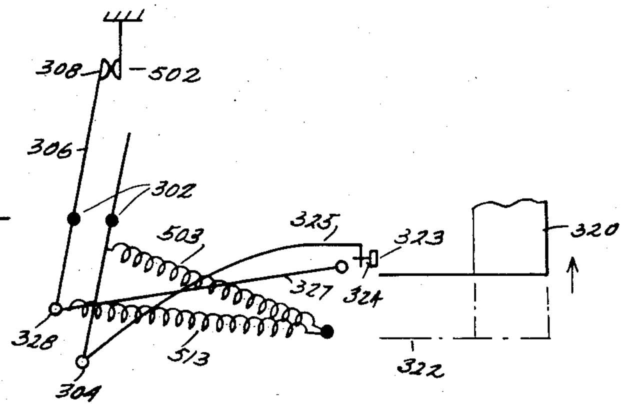
Figure 15:
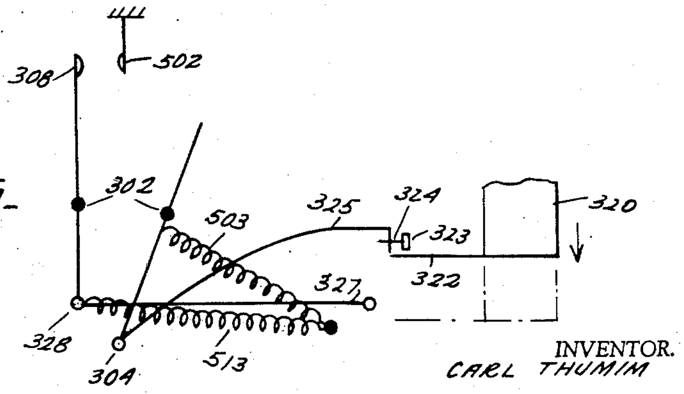

Figures 13, 14 and 15 schematically illustrate the operation of the control relay shown in Figure 1.

Under overcurrent conditions, an energized coil 139, aided by the core 141 pulls the armature 143 against itself. The unit 143 has a screw 145 threaded at one end thereof and which is used to effect an adjustable contact with the initial tripping member 140. The head 144 of the screw 145 acts to rotate bar 140 upon the energizing of the coil 139 and hits extension plate 146 which is bolted to the shaft 140, described above. When the head 144 hits the end of the extension plate 146, the shaft 140 is caused to rotate in a counterclockwise manner looking from the right of the circuit breaker 30, which is the view of Figure 1.

The shaft 140 is also caused to rotate by means of a coil 150 which upon being energized pulls an armature member 151 to it. The member 151 has a link 152 rigidly attached to one end 153 of member 151 by means of an angle 154. The link 152 is attached to the angle 154 by means of a threaded portion 199 of link 152 which enters the angle 154 and a nut 148. The angle 154 is movably attached to the member 151 by means of a pin 155. A restoring spring 147 attached to the member 151 resets the armature upon de-energization of the coil 150.

The link 152 is attached to the shaft 140 by means of another angle 156. The angle 156 is attached to the shaft 140 by means of two bolts 158 and to the link 152 by means of a cap 160. The cap 160 is movably attached to the link 152. Thus, the shaft 140 can now be caused to rotate by two methods, one due to the energization of the overcurrent trip coil 139 and the other due to the energizing of the coil 150. The coil 150 is remotely caused to be energized and is usually accomplished by manual operation of a remote pushbutton switch. The rotation of shaft 140 causes a link 162 to be moved by means of an angle 163 which is bolted to the shaft 140 by means of two bolts 164. The angle 163 has an indentation 165 near the farthest edge 166 from the shaft 140. The link 162 has two slots 168 and 167. The slot 167 engages the indentation 165 of angle 163.

The translatory movement of link 162 causes the rotation of a milled shaft 170. The milled shaft 170 has another angle 171 rigidly attached to it by means of two bolts 172. This angle has an indentation 173 near the end 174 which is farthest from the shaft 170. The indentation 173 of angle 171 engages the slot 168 of link 162. Thus, the rotation of shaft 140 causes the rotation of milled shaft 170. When milled shaft 170 rotates to release a latch 177, as is hereinafter described, the circuit breaker movable contacts are allowed to be disengaged from the stationary contacts.

The angle 171 described above has an abutment 178. This abutment 178 is engaged by a roller 179 which is rotated manually by means of the closing handle 184 attached to the shaft 180. Shaft 180 has a crank 181 which is rigidly attached to the shaft 180 by means of a screw 182. The roller 179 is attached to one end of the crank 181. When the shaft 180 is rotated by the closing handle 184, the roller 179 engages abutment 178 of angle 171 and rotates milled shaft 170. Thus, milled shaft 170 can be made to rotate by a plurality of methods. It can be made to rotate manually by means of closing handle 184; it can be made to rotate by means of an overcurrent condition in coil 139, as described above; and it can be made to rotate by means of an excitation of coil 150, as described above.

The latch 177 is an integral part of trip arm 185. The latch 177 engages the milled shaft 170 so that a small revolution of shaft 170 releases the latch 177, as hereinafter described. The shaft 170 is milled slightly past center at 186. The trip arm 185 is pivoted at 187 on a long pin 188. The pin 188 is also engaged on the trip arm extension 187 at point 183. The pin 188 breaks a movable arm 190. The movable arm 190 is pivoted on pin 188 at points 191 and 192 and extends beneath a roller 193. The roller 193 is the pivot point of a toggle mechanism consisting of two links 194 and 195 and is carried by a pin 202 which pivots at the meeting of links 194 and 195.

The links 194 and 195 each comprise two arms, 194A and 194B, and 195A and 195B, respectively. Arms 194A and 194B are pivoted on floating pin 196 described above and arms 195A and 195B are pivoted on pin 204, also described above.

The arms 194A and 194B support a rod 197 at 198 and 199, respectively. The rod 197 carries one end of a restoring spring 203 which is tensed by means of a stationary shaft 212, hereinafter described. The restoring spring 203 exerts a tension on the link 194 which tends to open or break the toggle mechanism. Link 194 is pivoted on a floating pin 196, which is supported by link arm 185 and its extension 189 being parallel to the pin 188. The other link 195 of the toggle is pivoted on movable link 200 which is connected by means of an adjustable insulator 201 to the movable contact assembly 61 described above. When the toggle mechanism consisting of links 194 and 195 is straightened out by means hereinafter described, pressure is put on movable link 200 by means of link 195 and bearing pin 204. The movable link 200 is pinned to insulator 201 by a pin 205 and moves so as to advance the insulator 201 and the movable contacts 61 towards the stationary contact 60.

In the exploded view shown in Figure 1, the contacts are open and the toggle mechanism consisting of links 194 and 195 is collapsed. The circuit breaker may be closed by a variety of methods. The circuit can be closed manually by means of shaft 180 rotated by closing handle 184, described above. If shaft 180 is rotated in the direction opposite to that of the arrow 184A, the roller 179 will engage the bottom of arm 190 and force the arm 190 against roller 193, thus straightening out the toggle mechanism and closing the circuit breaker contacts.

The movable links 200 are under an opening tension by means of opening spring 210 so that if no additional locking action other than described above for supporting the toggle existed, the circuit breaker would reopen immediately upon releasing the shaft 180. The locking device is supplied by means of a crank 211 which is located on a shaft 212 mentioned above, whose longitudinal axis is parallel to the axis of the milled shaft 170 and the rod 140. The crank 211 has two arms 213 and 214. The arm 213 is located, when the circuit breaker is open, adjacent the roller 193. When the roller 193 is forced upward, as due to the pressure of arm 190, the roller pushes against arm 213 of crank 211, rotating the crank 211 slightly on shaft 212. When the roller 193 has cleared the top of arm 213, the arm 213 snaps underneath the roller 193 due to the compression of a spring 220. The spring 220 which is wound on the shaft 212 has one end on an indentation 221 of crank 211 and the other end borne against a shaft 222 which pierces the trip arm 185. The shafts 212 and 222 have been moved out of position in the exploded view for the sake of clarity. Actually the shaft 222 pierces the trip arm 185 at point 207. The longitudinal axis of shaft 222 is essentially parallel to the longitudinal axis of shaft 212 and milled shaft 170.

When the roller 193 is moved, straightening the toggle, it causes crank 211 to rotate compressing spring 220. The roller clears the top of arm 213 letting the crank rotate in the opposite direction until the arm 213 is directly beneath and supporting the roller 193. The other arm 214 or crank 211 bears against the shaft 222 preventing further rotation of the crank 211 so that the arm 213 is stopped directly beneath the roller 193. The spring 220 is under compression normally so that the arm 214 is constantly bearing against the shaft 222. When the toggle is straightened, the rotation of the crank 211 moves the arm 214 away from the shaft 222 until the roller 193 clears the top of arm 213. Then the reverse rotation of the crank 211 occurs until the arm 214 again bears against shaft 212.

Thus, when the toggle is straightened and the circuit breaker closed, the crank 211 locks the toggle and thus locks the circuit breaker in a closed position.

The closing handle 184 by means of the shaft 180, after closing the circuit breaker by means of the rotation of roller 179 against the arm 190, as described above, is returned to its normal position by means of a crank 230. The crank 230 is pivoted on a stationary pin 231.

The crank 181 described above has an indentation 232 which meets a roller 233 of crank 230. The crank 230 supports a pin 234 which has a restraining spring 235 engaged at one end 236. The restraining spring 235 is attached to an angle 237 and is tensed on the pin 236, causing the crank 230 to rotate. The rotation of crank 230 causes the roller 233 to meet the indentation 232 returning the crank 181 to its normal position.

Figure 2:
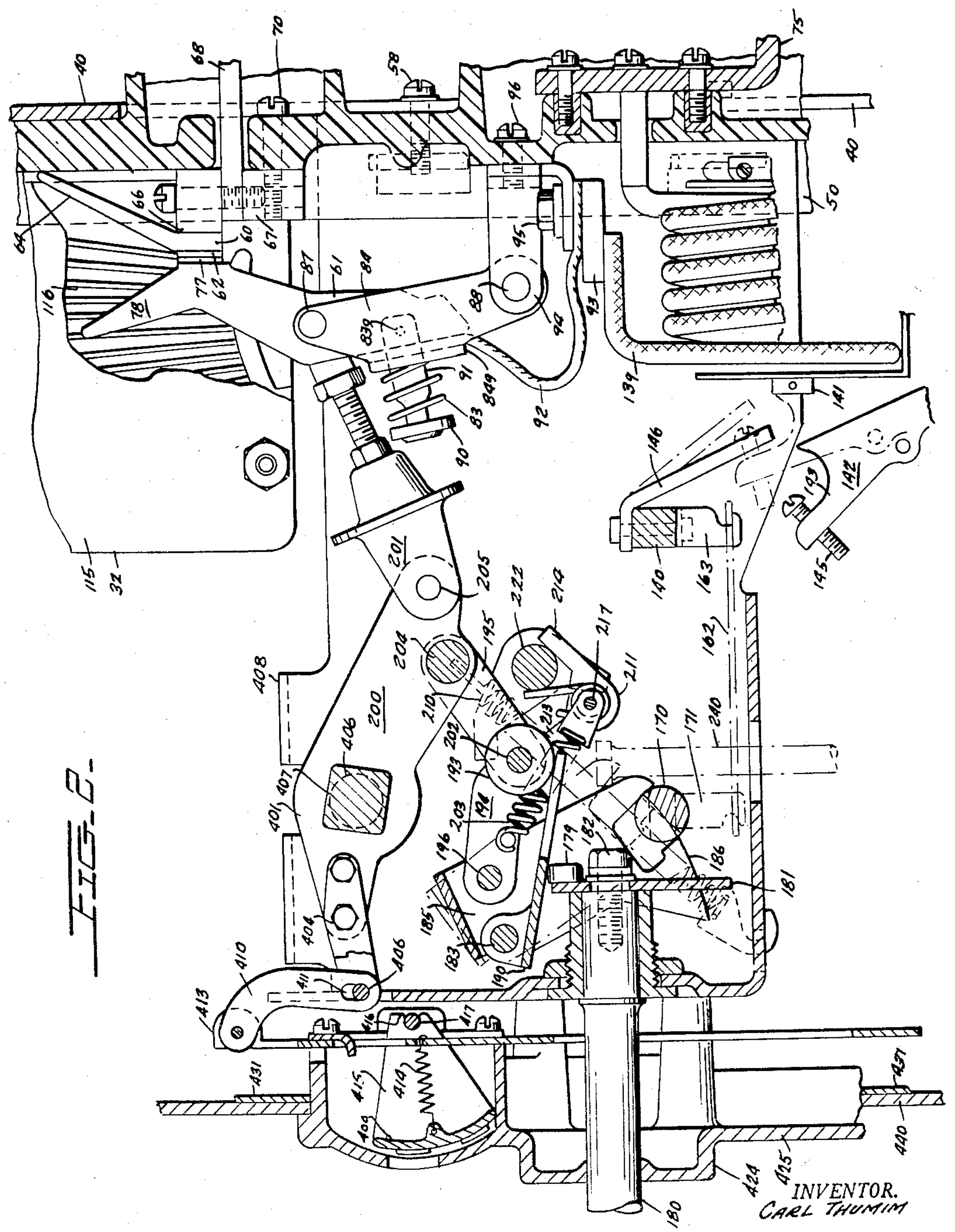
Figure 2 is a side view of the circuit breaker of Figure 1 illustrating the position of the various parts when the cooperating contacts are in closed position.
Figure 7:
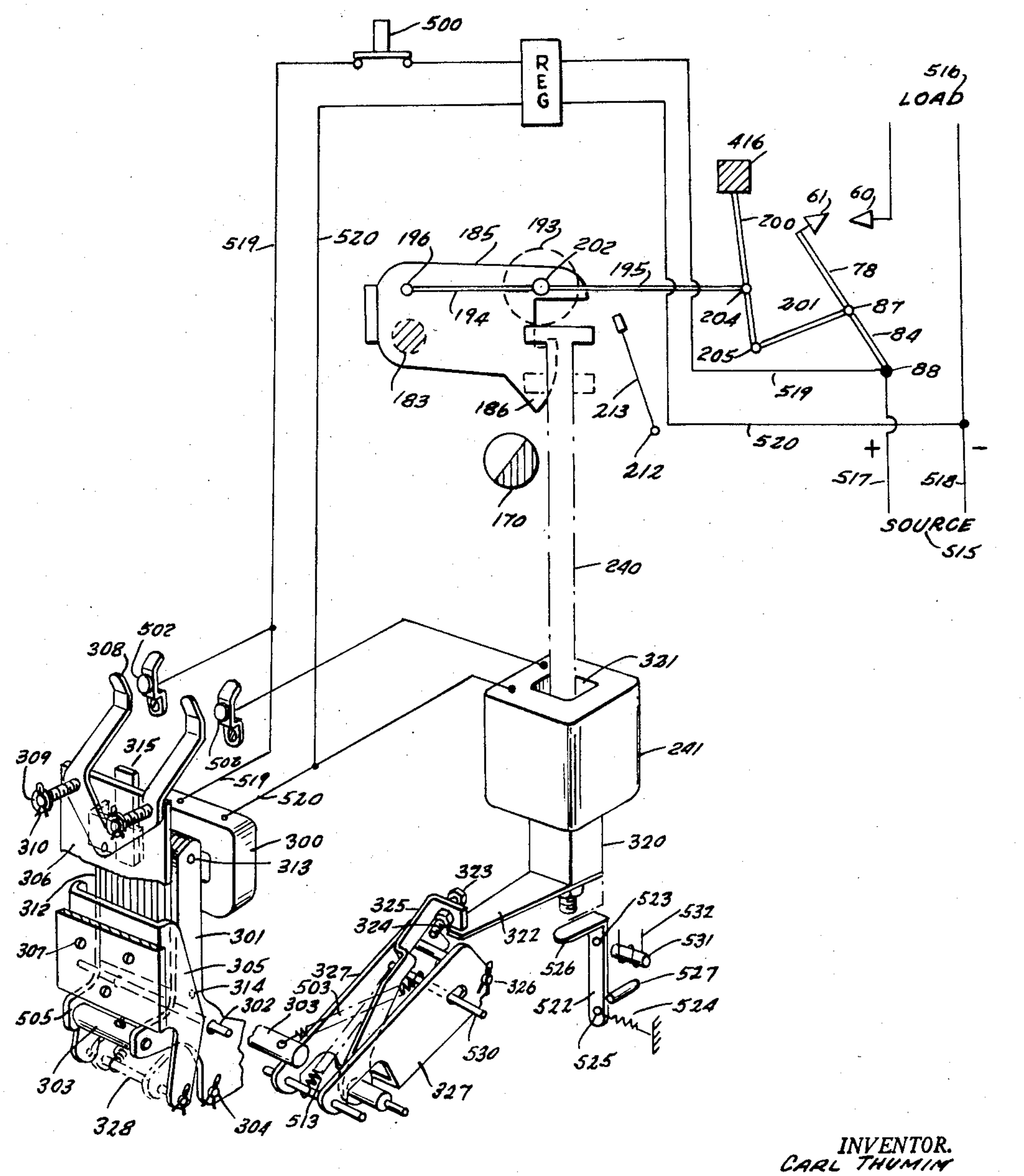
Figure 7 is a side schematic view illustrating the automatic closing system used in connection with the circuit breaker. This figure illustrates my first embodiment which operates under the principle of a mechanical lockout.

The circuit breaker may also be closed by means of a plunger 240 shown also in Figures 1, 2 and 7. The plunger 240 is part of the core of a solenoid coil 241. A remote signal energizes the coil 241 and causes the plunger extension 240 to push against the roller 193 in a similar manner as the arm 190. The roller 193 is a cylinder and has the arm 190 meet it on one half and the plunger extension 240 meet it at the other half. The plunger extension 240 raises the roller 193 straightening out the toggle mechanism and closing the circuit breaker with the locking action due to crank 211 similarly as described in reference to the manual closing of the circuit breaker.

The closing solenoid 241 is energized from a remote point in the following manner.

When the circuit breaker is desired to be closed from a remote point, a button 500 in Figure 7 is depressed which energizes the relay coil 300. The energized coil 300 acts as an electromagnet and attracts the movable armature 301, shown in Figure 1. A detailed view of the closing relay associated with the closing solenoid contacts is shown in Figure 7. The movable member 301 is pivoted in three places by pins 302, 303 and 304. The pin 302 is a fixed pivot but the other two pins, 303 and 304, are floating pivots. The pin 302 also supports an extension 305 of a movable bracket 306. The extension 305 is secured to the bracket 306 by means of three screws 307. The bracket 306 carries at one end the extension 305 and at the other end a V-shaped contact 308. The contact 308 is movably connected to bracket 306 by means of two pins 309. The pins 309 are movable with respect to the bracket 306 and the contact 308. The bracket 306 and the contact 308 are held together by means of the springs 310 supported against the top of the pins 309. The contracted springs 310 force the contact 308 against the bracket 306.

The movable member 301 has a laminated armature 312. The laminated armature 312 is rigidly attached to the member 301 by means of force fit pins 313 and 314. The movable member 301 has also as an integral part thereof an angle, not shown, which bears a dielectric rectangular strip 315. When the coil 300 is energized, the movable member 301 carrying the bracket 306 is locked against coil 300, as is hereinafter described, obviating the further energization of coil 300. Thus, touching the remote button, not shown, but briefly, is sufficient to lock the mechanism described against the coil 300.

When coil 300 is energized, it energizes in turn closing solenoid coil 241, described above, causing the plunger extension 240 to move against the roller 193. The plunger extension 240 carries at its distal end, a cross-sectionally square core 320 which slides with opening member 322. As the plunger completes the closing of the circuit breaker by means of pushing roller 193 onto arm 213, as described above, the member 322 engages the head 323 of a screw 324. The screw 324 is carried by a link 325 which is pivoted on a floating pin 304 of the movable member 301.

The link 325 normally rests against a pin 326 carried at one end of a tray-like member 327. The member 327 is pivoted at its other end on a floating pin 328 which also pivots the end of the extension 305 described above. Pin 303 and pin 328 carry springs which are tensed to pin 530.

The control relay, as described above, maintains the relay contact 308 in a substantially latched position with the armature 301 under normal conditions. Upon energization of the coil 300, the armature 301 moves to its closed position carrying the contact 308 with it. The engagement of the movable relay contact 308 with the stationary relay contacts 502 shown in Figure 1 establishes the circuit of the closing solenoid 241.

Referring again to the circuit diagram as shown in Figure 7, the closing of the remote switch 500 energizes the coil 300. The energization of coil 300 energizes coil 241 by closing and closes the contacts 308 and 502 described above.

The closing solenoid plunger 240 will open the latch engagement between the relay armature 301 and the relay contacts 308 when the closing solenoid plunger 240 nears its completion of the closing stroke. This allows the closing solenoid 241 electrical circuit to be interrupted when the circuit breaker is securely latched in the closed position. As long as the relay operating switch 500 is held in the closed position and the relay operating coil 300 remains energized, it will hold the relay armature 301 in sealed position while the relay contacts 308 remain in the open position. The relay armature 301 and the relay contacts 308 cannot relatch until the relay closing switch 500 is released. This operating characteristic makes the relay trip free. Continuous "pumping" of the circuit breaker closing mechanism is thus prevented using a maintained contact close switch under conditions when a fault remains on the circuit or where defective closing mechanism causes defective latching.

Figure 6:
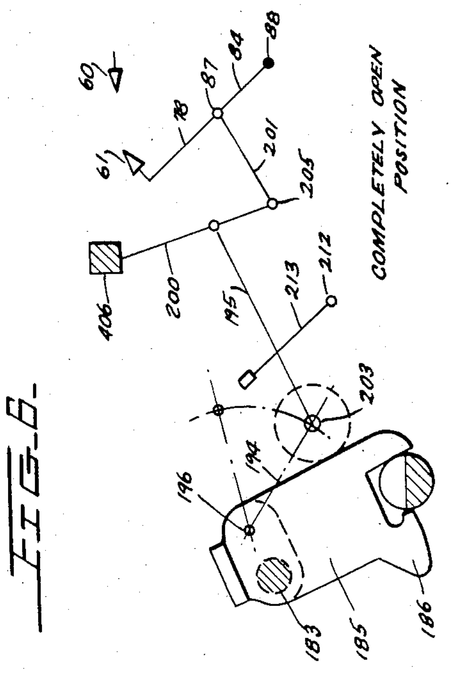
Figure 6 is a schematic view of the circuit breaker of Figures 1 and 2 illustrating the position of the parts when the circuit breaker is in the completely open position.
Figure 3:
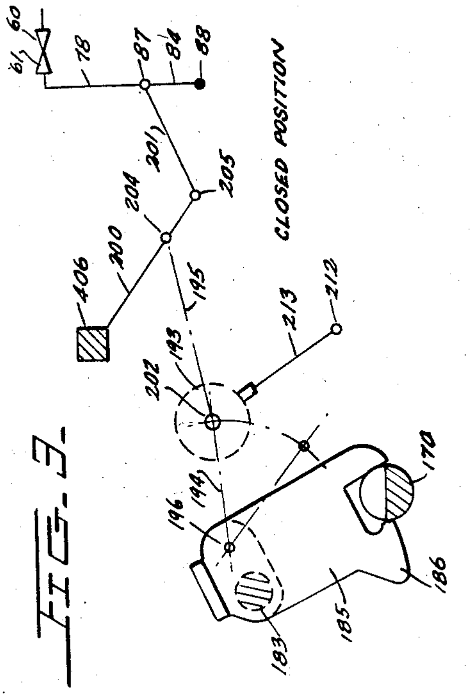
Figure 3 is a schematic view of the circuit breaker of Figures 1 and 2 illustrating the position of the various components when the circuit breaker is in the closed position.

The various positions of the operating mechanism are shown in Figures 6 and 3.

Figure 3 shows the closed position thereof, with link 195 pushed forward to raise the crank 200 and close the contact arm or insulator 201 and with the roller 193 on the arm or abutment 213.

The latch arm 185 is shown in appropriate latching engagement with the milled shaft 170.

Figure 5:
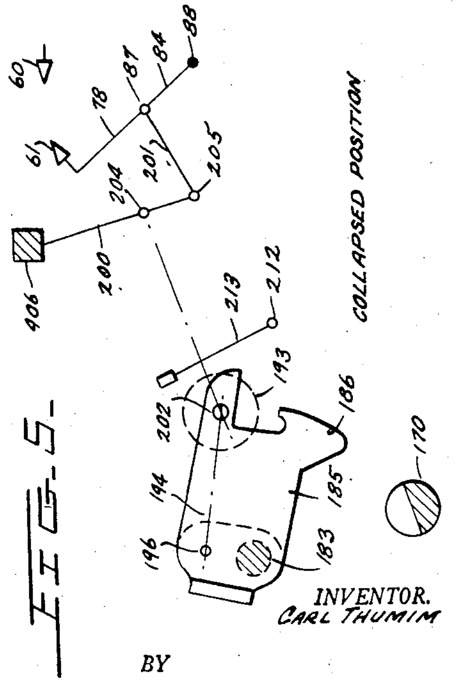
Figure 5 is a schematic view of the circuit breaker of Figures 1 and 2 illustrating the position of the various components when the circuit breaker is in the collapsed position.

When the shaft 180 described above is turned to release the mechanism, the condition as shown in Figure 5 results.

Figure 4:
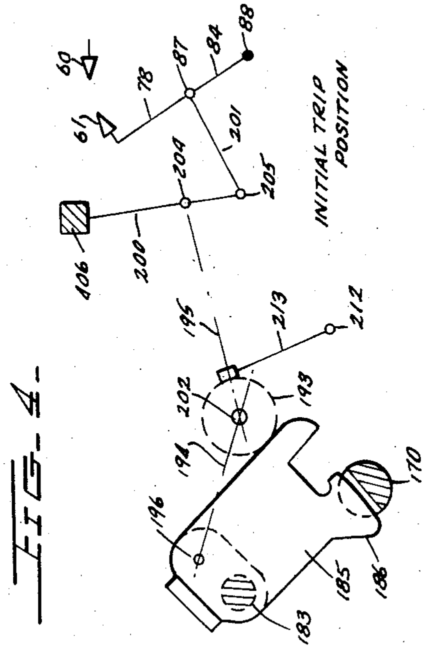
Figure 4 is a schematic view of the circuit breaker of Figures 1 and 2 illustrating the position of the parts during the initial trip position.

On the occurrence of tripping conditions, the milled shaft 170 is rotated to permit the latch arm 185 to move into the milled section of position 186 of the milled shaft 170, as seen in Figure 4.

Then as seen in Figure 5, the roller 193 drops off the abutment 213 to open the circuit breaker.

Thereafter, as seen in Figure 3, the latch arm 185 is restored to its initial position and the milled shaft 170 is restored to latching position so that the circuit breaker may again be moved from the open position of Figure 6 to the closed position of Figure 3.

The closing handle 184 returns to its neutral position automatically after tripping or closing the contacts unless it is latched as is hereinafter described. It becomes important to provide for some indication preferably visual of the contact position.

The portion of the latch 323—326 of the closing relay and its associated auxiliary contact member 306 is best seen in Figures 1 and 7. The closing relay as heretofore noted is constructed in such a manner that the unit 306 carrying the contacts for the closing solenoid coil 241 is latched to the relay armature 301 when the armature is in the neutral or open position.

Latch engagement between these two units is achieved by the engagement of the end 324 of the screw 323 with the pin 326. The pin 326 is carried by the auxiliary member 327, and a fixed pin 530 which passes through the elongated slots 501 and determines the limits of travel of member 327.

Two springs 513 and 503 are respectively secured to the fixed pin 530. The spring 513 is connected at its opposite end to the pin 328 which is rotatably mounted on the extension legs 504 of the unit 306 which carries the auxiliary contacts 308 for the closing solenoid 241. The other spring 503 is secured at its opposite end to the shaft 303 which, in turn, is pivotally mounted on the extension legs 505 of the armature 301. Hence, by means of the springs 513 and 503, the armature 301 and the auxiliary contact member 306 are biased toward a neutral position. The latch member 325, which carries the adjustment latching screw 323 is pivotally mounted on the pin 304 of the armature 301 and is the intermediate member through which armature 301 pushes member 327 which in turn pushes contact carrying member 306 to close contacts 308—502, provided latch 324 is in engagement with pin 326.

The operational phases of the latch mechanism are best seen in the schematic drawings of Figures 13–15. Figure 13 shows the latch 324 hooking over floating pin 326 when both armature 301 and member 306 are at rest. In Figure 14, the armature 301 has been rotated clockwise around its fixed pivot 302 by relay coil 300. As a result, floating pivot 304, member 325, and latch 324 are moved to the left. Latch 324, when it engages floating pin 326, then moves the latter, member 327, and floating pivot 328 to the left. Consequently, member 306 is rotated clockwise about the same fixed pivot 302, bringing contacts 308—502 into electrical engagement, energizing closing coil 241 and causing closing plunger 240, member 320, and latch trip arm 322 to move upward and strike latch head 323, delatching the mechanism. Member 306 is then biased back to the disengaged position by spring 513, as shown in Figure 15. This de-energizes closing coil 241 and causes latch trip arm 322 to drop latch 324 back on top of floating pin 324. When de-energization of relay coil 300 allows armature 301 to be biased back to its original position by spring 503, latch 324 will be pushed slightly to the right of floating pin 326, and hooking over of floating pin 326 by latch 324 will again occur, parts returning to the position of Figure 13.

Thus, when the circuit breaker is in the open position of Figure 1, the auxiliary contact member 306 will be latched to the armature 301. Consequently, when the relay coil 300 is energized, thereby attracting the armature 301 forward, the contact carrying member 306 will also move forward due to the latch engagement between these two members achieved by the engagement of the screw 324 with the pin 326. Upon forward movement of the member 306, due to this latch engagement, the movable contacts 308 will engage the stationary contacts 502.

Upon engagement of the movable contacts 308 with the stationary contacts 502, the closing solenoid 241 will be energized thereby moving the closing plunger 240 upwardly to thereby engage the roller 193 to move the circuit breaker linkage towards the closed position. The lower end of the plunger 240 is provided with an extension member 322 which moves in the path of the screw 323.

Near the latter end of the upward stroke of the plunger 240, its extension 322 will engage the outer end of the screw 323 thereby moving it upwardly. This action will thereby move the screw 323 with respect to the pin 326 thereby unlatching the engagement between the auxiliary contact member 306 and the armature 301. Consequently, even though the relay coil 300 continues to remain energized, thereby attracting the armature 301 to the closed or engaged position, the auxiliary contact member 304 will fall back to its neutral position by means of gravity thereby disengaging the cooperating contacts 308—502. That is, even though the operator may continue to energize the closing relay, the closing solenoid 241 will not be energized due to the unlatching of the auxiliary contact unit 306 from the armature 301.

With the deenergization of the closing solenoid 241 due to the disengaging of the cooperating contacts 308—502 the closing plunger 240 will be moved downwardly by the force of gravity. Since the screw 324 and the member 325 on which it is mounted has been rotated counterclockwise and held upwardly by the extension 322 of the plunger 240, these members will also be moved downwardly when the plunger 240 is moved downwardly by the force of gravity. Hence, at a predetermined position within the downward movement of the plunger 240, the extension 324 of the screw 323 will be brought down to rest on top of the pin 326. That is, assuming that the armature 301 is still maintained in energized position by the relay 300, there will be no latch engagement between the auxiliary contact member 306 and the armature 301 even though the extension 322 of the closing plunger 240 is not in engagement with the pin 323. However, as soon as the relay armature 301 drops back into its neutral position, the repositioning of the shaft 304 which carries the member 325 to which the screw 323 is attached will allow the spring 503—513 to move the extension member 327 so that the end 324 of the screw 323 will again engage the pin 326. Hence, the auxiliary contact member 306 will again be latched to the relay armature 301. Accordingly, on reenergization of the relay coil 300, both the armature 301 and the auxiliary contact member 306 will move upward together due to the latch engagement 323—326.

In the event that the armature coil 300 is energized from an auxiliary source, this above described latch mechanism between the armature 301 and the auxiliary contact member 306 will prevent pumping of the circuit breaker in the event that it is closed on a fault current. That is, even though the plunger 240 is energized to move the linkage mechanism of the circuit breaker towards closed position, the unit will be able to trip free and the automatic unlatching of the latch 323—326 by means of the extension 322 will permit the auxiliary contact member 306 to fall back to its neutral position thereby deenergizing a closing solenoid 241 due to the disengagement of the cooperating contacts 308—502. Hence, even though the operator continues to energize the relay coil 300, the circuit breaker will remain in the open position and there will not be a pumping operation to attempt to close same.

In the event the relay coil 300 is energized from the power line which the circuit breaker is designed to protect, then the above mentioned latch feature may not prevent pumping operation.

My instant invention is directed to novel construction and circuitry to prevent pumping of the circuit breaker when the relay coil 300 is energized from the power line being protected by the circuit breaker.

The reason why the above mentioned apparatus may not prevent pumping of the circuit breaker when the relay coil 300 is energized from the power line which is protected by the source is that the armature 301 and the auxiliary contact member 306 will move forward to go to the engaged position due to the latch 323—326, as heretofore described.

The closing solenoid 241 will accordingly be energized and the closing plunger 240 will be moved upwardly to move the circuit breaker linkage towards the closed position in the same manner as heretofore described. Also, the upward movement of the closing solenoid will bring the extension 322 into engagement with the pin 323 thereby automatically unlatching screw 323 from the pin 326. Hence, the auxiliary contact member 306 will fall back to its neutral position in exactly the same manner as heretofore described.

On the downward movement of the plunger 240, following the deenergization of the closing solenoid 241, the screw 323 will be brought to its first reset position, namely at rest on top of the pin 326. This operation is also the same as above described. However, in the event the circuit breaker is closed on a low impedance fault, the voltage may drop to such a low value that the relay coil 300 will not be sufficiently energized to maintain the relay armature 301 in the engaged position even though the operator is maintaining a closed circuit for the relay coil 300. That is, the closing of the main cooperating contacts 60—61 of the circuit breaker on a low impedance fault may sufficiently reduce the supply voltage for the relay coil 300 that the relay armature 301 will drop out even though the operator continues to maintain the closed circuit breaker button in the closed position.

When this happens, the movement of the relay armature 301 to its neutral position will automatically cause the reengagement of the latch 323—326. Hence, if the operator continues to maintain the closing button in the engaged position, the subsequent disengagement of the main contact 60—61 of the circuit breaker will result on the return of the fault line voltage since the circuit to the low impedance is now interrupted. Hence, the relay coil 300 will again be operated and since the auxiliary contact member 306 is latched thereto by 323—326, these two members will again move towards an engaged position. This will result in the engagement of the cooperating contacts 308—502, reenergization of the closing solenoid 241, and thus the movement of the closing plunger 240 to move the circuit breaker linkage towards closed position.

Since the operator is not aware of the fact that the circuit breaker is attempting to close on a low impedance fault, pumping operation will continue as long as he maintains the closing button 500 in the engaged position.

My invention is directed to novel apparatus and circuitry to avoid this very undesirable situation which may result in the complete ruin of the circuit breaker.

The closing plunger has a first position which is its lowermost position and a second position which is its uppermost position. During the movement of the operating plunger 240 from its first position to its second position due to its energization of the closing solenoid 241, the extension 322 will unlatch the latch 323—326. Since the unlatching will permit the auxiliary contact member 306 to fall back to its disengaged position, the closing solenoid 241 will thereby be deenergized due to the disengagement of the auxiliary contacts 308—502. Hence, the closing plunger 240—320 will be moved from the second position to its first position due to force of gravity.

At some intermediate third position between the second and first position, the extension 322 will release the screw 323 thereby partially resetting the latch engagement between member 306 and armature 301. That is, when the armature 301 is allowed to fall back to its disengaged position, the member 306 will automatically latch thereto due to the partial reset caused by the movement of the closing plunger 240—320 from the second to the third position. However, if the closing plunger 240—320 is maintained between the second and third position, the relay armature 301 will not be permitted to completely reset to its disengaged position following the de-energization of the relay coil 300.

Thus, in the first embodiment, I provide a mechanical lockout which is automatically operative following a first intentional closing operation which will maintain the closing plunger 240—320 in position between the second and third position so that relatching between the member 306 and the armature 301 is prevented.

Thus, it will be noted that the lockout member 522—526 has a first and second position, the second position indicated by the solid line of Figure 7 and the first position indicated by the dotted line.

When the automatic closing system is initially operated to intentionally close the breaker, the lockout member 522—526 will automatically move from the first to the second position. When the lockout member 522—526 is automatically moved to the second position, it will hold and maintain the closing plunger 240—320 between a first and third position. It is here assumed that the third position of the plunger 240 and 320 is that position when the extension 322 permits the partial reset of the latch 323—326. Thus, the mechanical lockout member 522—526 will maintain the closing plunger 240—320 in a position above the third position so that partial reset of the latch 323—326 does not occur.

In the first embodiment of my invention, I provide a mechanical arrangement to prevent the heretofore described pumping operation which may result when the relay coil 300 is energized from the power line being protected by the circuit breaker. This first embodiment is shown schematically in Figure 7 wherein the source 515 is supplying a load 516 and the power line 517—518 is protected by the cooperating contacts 60—61 of the circuit breaker.

The relay coil 300 is energized through the lines 519—520 which are connected to the main power lines 517—518, respectively. That is, the closing latch coil is energized from the same source being protected by the main contacts 60—61 of the circuit breaker. As heretofore noted, the latch arrangement between the relay armature 301 and the auxiliary contact member 306 is ineffective to prevent pumping operation in the event the circuit breaker is closed on a low impedance fault due to the relatching when the auxiliary contact member 306 with the relay armature 301 following the drop out of the relay armature 301 when the relay coil 300 is de-energized due to the closing on the low impedance fault. Hence, in my first embodiment, shown in Figure 1, I provide a latching means for the closing plunger 240 and closing solenoid 320 which will maintain this unit in an upward position following the trip free opening of the circuit breaker so that the extension 322 thereof will maintain the screw 323 upwardly thereby automatically preventing relatching of screw 323 with the pin 326. That is, even though the relay armature 301 may drop out due to a drop in voltage when closing on a low impedance fault, relatching of the auxiliary contact member 306 with the relay armature 301 is prevented by maintaining the screw latch 323 upwardly.

By providing latch means which will become effective immediately following the upward movement of the closing plunger 240 and the closing solenoid 241 so that these members can not return past the latch reset position, pumping operation of the circuit breaker is avoided. The latch member 522 of my invention is pivoted at fixed pivot 523 and biased in counterclockwise direction by the spring 524 which is secured to the free end 525 thereof. The member 522 has a latch extension 526 which extends perpendicular thereto.

A stationary stop member 527 is provided on the right side of the pivot member 522 to limit its counterclockwise rotation. The position of the circuit breaker operating parts illustrated in Figure 7 is that which same will assume when the circuit breaker trips free when automatically closed. At this time, the latch extension 526 is positioned below the lowermost surface of the closing solenoid 320 thereby maintaining the closing solenoid 320 and closing plunger 240 in the position indicated. This position is above the reset position so that the extension 322 maintains the latch screw 323 above the pin 326. Hence, in this position, even though the relay armature 301 may fall out to neutral position, there will be no relatching between the auxiliary contact member 306 and the armature 301.

When the circuit breaker and closing mechanism are in the position indicated in Figure 7, movement of the closing button 500 to the engaged position will result in the energization of the relay coil 300 thereby moving the relay armature 301 to the engaged position. However, since the auxiliary contact member 306 is not latched to the relay armature 301, there will be no engagement between the closing solenoid contacts 308—502 and hence, the closing solenoid 241 will not be energized. Therefore, a reset means is provided so that the operator may remove the latch 526 from the closing plunger 240 so that an intentional closing operation may be performed.

The reset mechanism is comprised of the plunger 531 which is energized from the coil 532. The coil 532 may be energized from the power line 517—518 or from a relatively small auxiliary direct current source. Upon energization of the reset coil 532, its plunger 531 will be moved to the left thereby engaging the lower portion of the member 522 to rock this unit about its stationary pivot 523. The rotation of the member 522 in a clockwise direction to the dotted position will thereby remove the perpendicular latch extension 526 from the lower surface of the closing solenoid 320. Hence, the closing armature 240 will be moved by gravity to its neutral lowermost position.

Since the downward movement of the closing plunger 240—320 will remove the extension 322 from engagement with the screw 324, the auxiliary contact member 306 will again be latched to the relay armature 301 in a manner heretofore described.

If the operator now moves the closing button 500 to the engaged position, the relay coil 300 will be energized and the relay armature 301 and the auxiliary contact member 306 will move forward together due to the latch engagement 323—326. Accordingly, the contacts 308—502 will now be in an engaged position to thereby energize the closing solenoid 241 and initial closing operation will follow.

Since the member 522 is biased in a counterclockwise direction by means of the spring 524, the member 522 will be rocked in a counterclockwise direction against the stop 527, as soon as the closing plunger 240—320 is moved upwardly. Hence, this movement of member 322 will thereby move the perpendicular latch extension 526 beneath the closing plunger 240—320 and maintain this unit above the latch reset position. Accordingly, if the circuit breaker should be closed on a low impedance fault and a main cooperating contact 60—61 should open on trip free operation, the falling out of the relay armature 301 due to the deenergization of the relay coil 300 will not result in a subsequent pumping due to the engagement of the extension 322 with the pin 324 which prevents relatching. That is, by providing latch means 526 which becomes operative following an initial closing operation, it is possible to automatically prevent relatching between the relay armature 301 and the auxiliary contact member 306 until the reset mechanism 531—532 is intentionally operated. Thus, even though the operator may unintentionally continue to maintain the closing button 500 in the engaged position, the subsequent trip free operation of the circuit breaker will not permit a second unintentional closing operation. Thus, for the sequence of operation, as above described, it will be necessary for the operator to utilize reset circuit 531—532 to remove the latch 526 before a second closing operation can be performed.

In a second embodiment of my invention, I substitute electrical lockout for the mechanical lockout described above in connection with Figure 7.

The electrical lockout is best illustrated in Figure 8.

Since the undesirable pumping operation occurs as a result of re-energization of the control relay coil following its de-energization upon the attempted closing on a fault current low impedance line, pumping operation can be eliminated by providing means which will prevent an unintentional second energization of the control relay coil.

In the mechanical lockout embodiment described above in connection with Figure 7, anti-pumping operation was achieved by mechanically preventing the relatching of the auxiliary contact member 306 with the relay armature 301. In the second embodiment of Figure 8, anti-pumping operation is achieved by electrical lockout by preventing the reenergization of the relay coil 300.

In the second embodiment of Figure 8 whereby the anti-pumping operation is achieved by electrical lockout, I provide an auxiliary protective contact 540 which is connected in series with the energizing circuit for the relay coil 300 and is shunted by a large impedance 541. Auxiliary protective contact 540 is opened by the upward movement of the closing plunger 240—320 and is closed by means of a reset circuit 543—544. Figure 8 illustrates only the electrical circuit and the mechanism by which the closing plunger 240—320 operate the auxiliary control contact 540.

The operating parts will assume the position indicated in Figure 8*a* immediately following a closing operation. The electrical lockout is achieved as follows: The bell crank member 550 is pivoted at stationary pivot 551 and is provided with arms 552 and 553. The pin 554 secured to and extending perpendicular to the closing armature 320 is in alignment with the leg 552 of the bell crank 550. In the position indicated, the bell crank 550 has been moved to its extreme clockwise position against the stationary stop member 555 due to the upward movement of the closing armature 320 and the engagement of its extending pin 554 with the left side of the leg 552 of the bell crank 550.

An overcenter spring 556 connected to the stationary point 557 is connected to the bell crank 550 and will maintain the bell crank 550 in its extreme clockwise position against the stationary stop 555 when it has been moved to this position by means of pin 554 of the plunger 320. The leg 553 of the bell crank 550 is provided with a bridge contact 560.

When the bell crank 550 is in its extreme clockwise position, as indicated in Figure 8*a*, the bridging contact member 560 will be disengaged from its stationary cooperating contacts 540. As will hereinafter be more fully explained, the cooperating contacts 540—560 comprise the auxiliary control contacts for the closing relay coil 300.

The position indicated in Figure 8 is the position which the various components will assume following an initial intentional closing operation. In the event the operator should now close the closing button 500, the energizing circuit for the closing relay coil 300 will be through the shunt high impedance 541. That is, since the auxiliary control contacts 540—560 are now disengaged, the energizing circuit for the relay control coil 300 will have to pass through the high impedance 541. Even though the relay closing coil 300 is energized from the main line 517—518 through the leads 519—520, the impedance 541 will be sufficient in magnitude to limit the current so that the relay control coil 300 will be insufficiently energized to attract its armature 301. Thus, in the position indicated, it will be necessary for the operator to reset the auxiliary control contact operating mechanism 550 before the breaker can be automatically closed. This is achieved by means of the reset circuit 543—544. The reset coil 544 may be energized in any desirable manner as for example from the main power line 517—518 or from a relatively small auxiliary D.-C. source.

Upon energization of the reset coil 544, the reset plunger 543 will be moved upwardly thereby engaging the leg 551 of the bell crank 550. Since the closing plunger 240—320 will be in its lowermost position (indicated by the dotted lines) the bell crank 550 will thus be rocked about its stationary pivot 551 to an extreme counterclockwise position. The extreme counterclockwise position will be determined by the pin 554 which extends from the closing armature 320.

The overcenter spring 556 will now maintain the bell crank 550 in its extreme counterclockwise position. Since the counterclockwise rotation of the bell crank 550 moves its relay 553 upwardly, the bridge contact member 560 will now be brought into engagement with the stationary contacts 540. Hence, when the operator closes the closing switch 550, the energizing circuit for the relay closing coil 300 will now bypass around the high impedance 541 through auxiliary control contacts 540—560. Thus, the relay control coil 300 will now be sufficiently energized to attract the armature 301.

Since the auxiliary contact member 306 is latched to the tray armature 301, the two units will move together due to the attracting force of the relay coil 300 and hence, the auxiliary contacts 308—502 will be engaged to cause energization of the closing coil 241.

Accordingly, the closing plunger 240—320 will be moved upwardly due to the energization. Upon the upward movement of closing members 240—320, the pin 554, after engagement with the left side of the leg 552, thereby rocking the bell crank 550 to its extreme clockwise position against stop 555 to thereby disengage the bridge member 560 from the stationary contacts 540.

The high impedance 541 may be of such a magnitude to permit sufficient current to flow through the relay coil 300 to maintain the relay armature 301 in closed position although this magnitude of current may not be sufficient to move the armature 301 from disengaged to engaged position.

Thus, even though the armature 301 would drop out in the event that the cooperating contacts 60—61 are closed on a low impedance fault, the relay armature 301 can not be moved from engaged to disengaged position since the high imedance 541 will limit the energization of relay coil 300. Accordingly, a pumping operation is automatically limited by means of this lockout arrangement.

The electrical connection for the arrangement of Figure 8*a* is shown in Figure 8*b* which illustrates that the relay coil 300 is energized from the main power line 517—518.

In the third embodiment of my invention, I combine both electrical and mechanical lockout to insure anti-pumping operation of the closing means for the circuit breaker. The third embodiment illustrated in Figures 9 and 10 is therefore a combination of the mechanical lockout means described in connection with Figure 7 and the electrical lockout described in connection with Figure 8. In this third embodiment, mechanical lockout is achieved by means of the latch member 565 and electrical lockout is achieved by means of the auxiliary control contacts 540—560.

The control of the latch 565 and the auxiliary control contacts 540—560 is as follows: Member 561 is pivoted at stationary pivot 562 and biased in a clockwise direction by means of the spring 562'. The latch member 565 is pivoted at the extreme left hand end of the member 561 and is provided with spring means 566 which biases the pivotally mounted latch member 565 in a counterclockwise direction against the stationary stop member 567. Thus, in the position indicated in Figure 9, the latch member 565 is rotated to its extreme clockwise position by means of the spring 566 thereby maintaining the closing solenoid 240-320 in an upward position so that the extension 322 holds the screw 324 above its cooperating latch pin 326. Thus, the latch member 565 effects mechanical lockout. The extreme right hand end of the member 561 carries the bridging contact 560. Since the latch member 565 is propped beneath the lower surface of the closing plunger 240—320, the biasing spring 562 is ineffective to rotate the member 561 against its clockwise stationary stop limiting means 570. Thus, the bridging contact member 560 remains in disengagement with respect to its stationary contacts 540. In the event that the operator should now push the closing button 500 to the closed position, the relay closing coil 300 will not be energized due to the open circuit controlled by the auxiliary control contacts 540—560.

The auxiliary control contacts 540—560 effect electrical lockout of the system. If the operator wishes to complete the intentional closing operation, it will be necessary to first operate the reset system comprising the coil 544 and plunger 543. The reset coil and armature operate in substantially the same manner as heretofore described in connection with the second embodiment of Figure 8 and the first embodiment of Figure 7.

Upon the energization of the reset coil 544, the plunger 543 will be moved to the left thereby rocking latch member 565 about the movable pivot 571 against the bias of the spring 566. That is, the latch member 565 will be rotated to its extreme clockwise position against the pivot 566 as indicated in Figure 10. Since the obstacle for rotating member 561 has now been removed, the biasing spring 562 can now rotate member 50 against the stationary stop 570 thereby bringing the bridge contact member 560 into engagement with the stationary contacts 540. Thus, it will be noted that the operation of the reset coil 543—544 serves the dual function of (*a*)—mechanical lockout—removing the stop latch 571 from the closing plunger 240—320 thereby allowing this unit to be pulled by gravity towards its lowermost position and effect relatching of the auxiliary contact unit 306 with the relay armature 301 and (*b*)—electrical lockout—allowing the biasing spring 562 to rock the member 561 in a clockwise direction against the stop 570 thereby effecting engagement between the cooperating contacts 540—560 to thereby complete the energizing circuit for the relay coil after the closing switch 500 has been closed.

The position of the parts, after the reset coil has been operated, is indicated in Figure 10. The electrical connection of the various components illustrated in the two views of Figures 9 and 10 is shown in Figure 10*a* which illustrates that both the relay coil 300 and the solenoid closing coil 241 are energized from the power line 517—518.

In the fourth embodiment of my invention, I provide an under voltage arrangement in which anti-pumping or single shot operation con be achieved. In this embodiment, auxiliary control contacts are operated from a control relay which is effective to move the auxiliary contacts to the disengaged position on the occurrence of an under voltage condition.

In order to insure proper operation, a non-magnetic material gap of definite value is placed in the iron core of the control relay. On the occurrence of an under voltage, the armature will be urged upon by means of the biasing spring thereby moving the auxiliary control contacts to disengaged position.

The auxiliary control contacts are of a nature similar to 540—560, described above in connection with the second and third embodiments of my invention.

The fourth embodiment is completely electrical and can be made in the form of a relay which is mounted from the circuit breaker. This arrangement has the advantage of requiring no mechanical modifications to existing circuit breaker and permits the use of space where it happens to be available.

More particularly, the fourth embodiment is set forth in Figure 11 and the electrical circuitry therefor in Figure 12. In this arrangement, the auxiliary control contacts are again identified by the numerals 540, the auxiliary stationary control contacts and the auxiliary bridge contact are again described by the numerals 540—560. These contacts are in series with the energizing circuit to the relay coil 300 in substantially the same manner as set forth in connection with Figures 8, 9 and 10.

When the magnetic core 581 of the voltage control relay 580 is properly energized from the voltage coil 582, the magnetic armature 583 will be moved to engaged position thereby closing the auxiliary control contacts 540—560. The non-magnetic member 587 is placed in a gap between the iron magnetic core 581 and the magnetic armature 583 in order to provide very positive operation of the device. Energized voltage coil 582 holds the magnetic armature 583 in a closed position against the bias of the biasing spring 584. When the various components are in the position indicated in Figure 11, the circuit breaker can be automatically closed when the operator pushes the closing button 500 since the energizing circuit of the relay coil 300 is complete through the auxiliary control contacts 540—560.

In the event the circuit breaker is closed on a low impedance fault, the energizing voltage for the voltage coil 580 will drop so that the armature 583 will be pivoted around its stationary pivot 585 due to the bias of the spring 584 and be brought against stationary stop 586. Thus, the auxiliary control contacts 540—560 will be opened and hence, even though the operator may continue to maintain the closing switch 500 in engaged position, the relay coil 300 will not be energized due to the incomplete circuit caused by the disengagement of contacts 540—560. That is, even though the auxiliary contact member 306 is latched to the relay armature 301, these two units will not be brought to their engaged position since it is impossible to energize the relay coil 300 in view of the disengaged contacts 540—560. Thus, the occurrence of an under voltage condition, which may be the result of an attempted closing on a low impedance fault, will result in the interruption of the energized circuit to the relay coil 300 to thereby insure single shot or anti-pumping operation.

The fourth embodiment of Figures 11 and 12 is provided with reset means which must be operated prior to an attempted intentional closing operation following an initial unsuccessful closing operation. The reset means is comprised of a reset coil 544 and a reset plunger 543 which operates in substantially the same manner as heretofore described in connection with the first, second and third embodiment of my invention.

In the under voltage lockout arrangement of Figure 11, energization of the reset coil 544 will move the plunger 543 to the left thereby rocking the magnetic armature 583 about its stationary pivot 585 against the bias of the spring 584 so that the auxiliary control contacts 540—560 are again brought into engagement.

It will be noted that with the non-magnetic material gap 587, a full voltage on the voltage coil will not be sufficient to move the armature from the disengaged to the engaged position. However, the ampere turns created by this full voltage will be sufficient to maintain the armature in the engaged position illustrated.

As seen in the circuit diagram of Figure 12, the voltage coil 582 may be energized directly from the main power lines 517—518 and in parallel therewith is placed a relay coil 300 and the closing solenoid 241.

The auxiliary control contacts 540—560 are connected in series with the closing operation button or switch 500 and the closing coil 300. Thus, if the contacts 540—560 are in engagement, as illustrated in Figure 11, the relay coil 300 will be energized whenever the operator operates the closing button 500.

Due to the latch engagement between the auxiliary contact member 306 and the relay armature 301, the auxiliary contacts 308—502 will be closed thereby permitting energization of the closing coil 241 in the parallel circuit. However, it will be noted that prior to the time when the operator pushes the closing button 500, it will be necessary to first energize the reset circuit 543—544 in order to close the auxiliary control contacts 540—560 as above described.

Accordingly, with my first, second, third and fourth embodiment, I have provided an automatic closing means for circuit breakers which, although energized from the same source being protected by the circuit breaker, will insure single shot anti-pumping operation of the closing means.

In the first embodiment of my invention, I achieve single shot operation by a power line mechanical lockout. In the second embodiment of my invention, I achieve single shot anti-pumping operation by electrical lockout. In the third embodiment of my invention, I achieve single shot anti-pumping operation by means of electromechanical lockout. In the fourth embodiment of my invention, I achieve single shot anti-pumping operation by means of an under voltage lockout.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a closing system for a circuit breaker; a closing relay, a closing plunger, and a closing solenoid; said closing relay comprising an armature, a coil, an auxiliary contact member and a cooperating contact for said auxiliary contact member; said armature having an engaged and a disengaged position; said auxiliary contact member being movable between an engaged and disengaged position with respect to said cooperating contact responsive to energization and deenergization respectively of said relay coil; a latch mechanism; said auxiliary contact member and said relay armature being operatively connectible to one another by said latch mechanism when said auxiliary contact member and said relay armature are both in their said disengaged positions; biasing means for each of said relay armature and said auxiliary contact member; said biasing means biasing said relay armature and said auxiliary contact member to their said disengaged positions; a manual closing switch and a voltage source; said manual closing switch being connected in series with said closing relay coil and said voltage source; said voltage source being derived from the circuit being protected by said circuit breaker; said manual closing switch being further connected in series with said voltage source, said movable contact member, said cooperating contact member and said closing solenoid; said solenoid plunger being movable between a first and second position responsive to energization and deenergization respectively of said closing solenoid; a latch trip means for unlatching said latch mechanism; said latch trip means being carried by said solenoid plunger; said latch trip means being moved to unlatch said latch mechanism when said solenoid plunger is moved to its said first position to allow said contact member to be disconnected from said relay armature and returned to its said disengaged position under the influence of its said biasing means; and a lock-out means for preventing pumping; said lock-out means including mechanism operatively connected to said solenoid plunger; said lock-out mechanism being operable responsive to initial operation of said solenoid plunger to defeat a reclosure of said contact member and said cooperating contact.

2. The device of claim 1 wherein said lock-out means comprises auxiliary latch means; said auxiliary latch means being positioned to latch said solenoid plunger in said first position when said solenoid plunger is moved thereto to thereby maintain said latch mechanism defeated by said latch trip means; and reset means for unlatching said auxiliary latch means.

3. The device of claim 1 wherein said lock-out means includes normally closed contact means connected in series with said relay coil; said normally closed contact means being moved to a latched open position by said lock-out means when said solenoid plunger moves to said first position; and reset means for thereafter reclosing said contact means.

4. The device of claim 3 wherein said lock-out means further includes auxiliary latch means; said auxiliary latch means being positioned to latch said solenoid plunger in said first position when said solenoid plunger is moved thereto to thereby maintain said latch mechanism defeated by said latch trip means.

5. The device of claim 1 wherein said lock-out means is positioned to interfere with the return of said closing plunger to prevent relatching of said auxiliary contact member to said relay armature; said lockout means having a first and second position; said lock-out means in said second position being operative to prevent movement of said closing plunger to said second position; said lock-out means being biased from its said first position to its said second position by biasing means when said closing plunger is moved from said second to said first position; and reset means for moving said lock-out means from said second position to said first position when said closing plunger is between said first and second position; movement of said lock-out means from said second to said first position permitting said closing plunger to move to said second position.

6. The device of claim 1 where said lock-out means is operative to prevent re-energization of said relay coil following each closing operation; said lock-out means comprising auxiliary control contacts connected in series with said relay coil; a bell crank means operatively connected to said auxiliary control contacts; said bell crank means and said auxiliary control contacts having a first and second position; movement of said closing plunger from said second position to said first position moving said bell crank and said auxiliary control contacts from their said first to their said second position; biasing means connected to said bell crank to maintain said bell crank and said auxiliary control contact in said second position after said closing plunger moves from said first to said second position; and reset means for moving said bell crank and said auxiliary control contacts from said second to said first position; said biasing means maintaining said bell crank and said auxiliary control contacts in said first position.

7. The device of claim 1; said lockout means comprising electrical and mechanical means to insure pump-free operation of said relay following an attempted closing operation on a low impedance fault; said electrical means comprising an auxiliary control switch connected in electrical series with said relay coil; said auxiliary control contacts being biased to a disengaged position by a biasing means when said closing plunger is moved from said first to said second position; a pivotally mounted control means for operating said auxiliary contacts, said mechanical means comprising a lock-out member pivotally mounted on said control means for said auxiliary control contacts; said lock-out member having a first and second position; said lock-out member moved from said first to said second position when said closing plunger is moved from said second to said first position; reset means positioned to allow an operator to intentionally move said lock-out member from said second to said first position; said lock-out member in said first position permitting said control means to pivot to allow said auxiliary control contacts to be moved to engaged position.

8. The device of claim 1 wherein said lock-out means comprises an under-voltage relay; said under-voltage relay including a pair of contacts connected in series with said manual closing switch; said pair of contacts being moved to and maintained in a disengaged position responsive to a loss in control voltage.

References Cited in the file of this patent

UNITED STATES PATENTS

| | | |
|---|---|---|
| 1,134,752 | Leonard | Apr. 6, 1915 |
| 1,149,150 | Steen | Aug. 3, 1915 |
| 1,293,691 | Burnham | Feb. 11, 1919 |
| 2,246,298 | Dyer et al. | June 17, 1941 |
| 2,274,350 | Thumim | Feb. 24, 1942 |
| 2,640,122 | Oppel et al. | May 26, 1953 |
| 2,748,221 | Edwards et al. | May 29, 1956 |
| 2,832,917 | Clausing | Apr. 29, 1958 |